United States Patent [19]

Hioki et al.

[11] Patent Number: 4,918,539
[45] Date of Patent: Apr. 17, 1990

[54] FREQUENCY MULTIPLEXING CIRCUIT IN OPTICAL VIDEO DISC RECORDER

[75] Inventors: Toshiaki Hioki, Ogaki; Yoshihiko Morita, Gifu; Hiroshi Watanabe, Gifu; Tateo Toyama, Gifu, all of Japan

[73] Assignee: Sanyo Electric Co., Ltd., Moriguchi, Japan

[21] Appl. No.: 182,809

[22] Filed: Apr. 18, 1988

[51] Int. Cl.⁴ .............................................. G11B 7/00
[52] U.S. Cl. .................... 358/342; 358/343; 358/340
[58] Field of Search ............... 358/341, 342, 343, 336, 358/340, 328; 360/19.1

[56] References Cited

FOREIGN PATENT DOCUMENTS 62-109262 5/1987 Japan .

OTHER PUBLICATIONS

Nikkei Electronics, 1984, vol. 3, No. 12, pp. 112–116.
Publication entitled "New Transmission System of High-Quality Television", Yuichi Ninomiya, NHK (Japan Broadcasting Corp.).
Science and Technical Research Laboratories, Tokyo, Japan, 6/6/84, pp. 1–24.
"HDTV Broadcasting and Transmission System-Muse-", Ninomiya et al., NHK (Japan Broadcasting Corp.), Science and Technical Research Laboratories, Tokyo, Japan, pp. 4.1.1–4.1.31.

Primary Examiner—Robert L. Richardson
Attorney, Agent, or Firm—Armstrong, Nikaido, Marmelstein, Kubovcik & Murray

[57] ABSTRACT

A frequency multiplexing circuit in an optical video disc recorder frequency-multiplexes a second signal comprising a digital sound signal on the low frequency band of a first signal comprising a frequency-modulated video signal to generate a recording signal. In addition, the recording signal is applied to a limiter to be limited. In this case, a noise component produced in a band of the second signal is extracted by using a Bessel filter and a subtractor and previously subtracted from the recording signal generated by frequency multiplexing. The recording signal including a negative noise component is applied to the limiter, so that harmonic noise and linear distortion noise essentially produced in an output of the limiter can be cancelled. Furthermore, a slice level of the limiter is suitably adjusted, so that asymmetrical noise in the output of the limiter can be also eliminated.

5 Claims, 4 Drawing Sheets

FIG.1
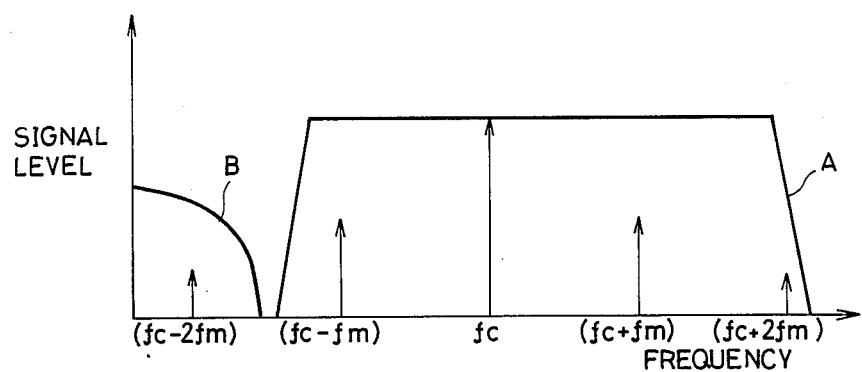
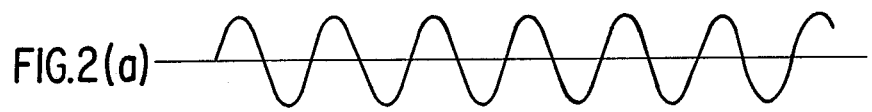
FIG.2(a)
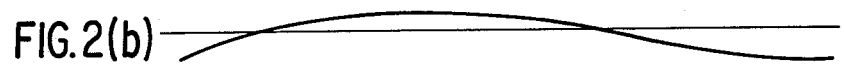
FIG.2(b)
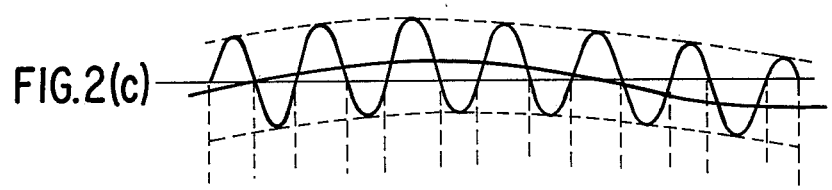
FIG.2(c)
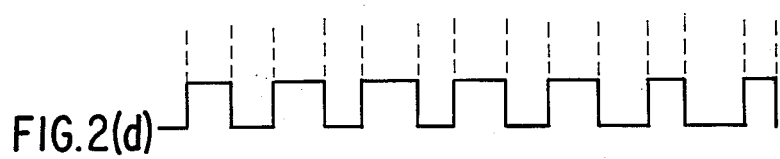
FIG.2(d)

FREQUENCY MULTIPLEXING CIRCUIT IN OPTICAL VIDEO DISC RECORDER

BACKGROUND OF THE INVENTION

1. Field of the Invention

The present invention relates to a frequency multiplexing circuit and more particularly, to a circuit, in an optical video disc recorder, for cancelling various noises produced when a recording signal, obtained by frequency-multiplexing a second signal comprising, for example, a digital sound signal, on the low frequency band of a first signal comprising a frequency-modulated video signal, is limited through a limiter.

2. Description of the Prior Art

In the conventional optical video disc recorder, a second signal comprising a frequency-modulated sound signal or a digital sound signal is frequency-multiplexed on the low frequency band of a first signal obtained by frequency-modulating a video signal to generate a recording signal. The recording signal is further limited through a limiter and then, supplied to optical modulator means. The optical modulator means is responsive to the recording signal as supplied for intermittently irradiating a laser beam onto a rotary disc to form pits on the surface of the rotary disc. Such an optical video disc recorder is disclosed in, for example, Japanese Patent Publication NO. 29562/1978.

However, in such a conventional optical video disc recorder, three kinds of noises are included in the second signal in the recording signal, as described below.

FIG. 1 is a diagram showing a frequency spectrum for explaining the above described frequency multiplexing of the second signal on the low frequency band of the first signal. In FIG. 1, the axis of the abscissa shows the frequency and the axis of the ordinate shows the signal level. In FIG. 1, fc, in the center of the axis of the abscissa, represents a carrier frequency of the first signal.

In general, in the optical video disc recorder, a low-frequency component of the first signal is previously removed by using, for example, a filter and then, the second signal is frequency-multiplexed so that the low-frequency component of the first signal does not affect a frequency band of the second signal. Thus, a frequency band of the recording signal, after frequency multiplexing, is adapted such that a band A of the first signal does not overlap with a band B of the second signal, as shown in FIG. 1.

However, if the low-frequency component of the first signal is previously removed before frequency multiplexing as described above, a sideband of a frequency-modulated video signal of the first signal is included in the second signal after frequency multiplexing to generate harmonic noise.

More specifically, as shown in FIG. 1, the first signal essentially includes first harmonics in the positions of fc±fm (m:modulating frequency) and second harmonics in the positions of fc±2fm, symmetrically with respect to the carrier frequency fc of the first signal in each case. In addition, the first signal also includes third harmonics in the positions of fc±3fm (not shown). More specifically, as obvious from FIG. 1, the video signal of the first signal includes a sideband generated in the position of, for example, fc−2fm in the frequency band B of the second signal. Such a sideband of the low frequency band can be certainly removed in advance by the filter before frequency multiplexing.

However, the sideband of the video signal once removed by the filter is produced again at a level which is approximately half of the original level in the second band B of the recording signal by applying, to a limiter, the recording signal after frequency multiplexing to make the amplitude thereof constant. Such a sideband, as produced, again deteriorates the SN ratio of the second signal in the recording signal.

FIG. 2 is a waveform diagram for explaining the process of frequency-multiplexing a first signal and a second signal to generate a recording signal, where FIG. 2(a) shows the first signal (a sinusoidal wave) obtained by frequency-modulating a video signal, FIG. 2(b) shows the second signal comprising a frequency-modulated sound signal, FIG. 2(c) shows a signal obtained by frequency-multiplexing the first signal and the second signal, and FIG. 2(d) shows a recording signal obtained by limiting the amplitude of the signal shown in FIG. 2(c) by a limiter. Pits are formed on the surface of a rotary disc corresponding to this recording signal (d) as a two-level signal.

Thus, as obvious from FIGS. 2(c) and 2(d), a pit forming pitch, i.e., the distance between the centers of the adjacent pits is defined by the first signal of a sinusoidal wave, and a duty cycle of each pit is defined by the second signal. More specifically, if the first signal linearly changes as a triangular wave, it is considered that the duty cycle of the pit changes in direct proportion to the level of the second signal (b). However, as shown in FIG. 2(a), if the first signal is a sinusoidal wave, a portion which linearly changes is only a part of the entire waveform, so that the duty cycle of the pit does not change in direct proportion to the level of the second signal (b). Consequently, linear distortion noise is produced in the recording signal.

FIG. 3 is a graph for explaining the principle of generating linear distortion noise, where the axis of the abscissa shows the amount of change in the duty cycle and the axis of the ordinate shows the level of the second signal. In FIG. 3, a straight line X, represented by a broken line, shows an ideal characteristic of the amount of change in the duty cycle when the first signal linearly changes in all portions. On the other hand, a curved line Y, represented by a solid line, shows a characteristic of the amount of change in the duty cycle when the first signal is a sinusoidal wave as shown in FIG. 2(a). For example, in the ideal characteristic represented by the straight line X, the amount of change in the duty cycle must be "B" when the level of the second signal is "A". However, in the actual characteristic represented by the curved line Y, the corresponding amount is "C". As a a result, modulation distortion of (C−B) occurs. More specifically, as obvious from FIG. 3, the linear modulation distortion increases as the level of the second signal increases.

Then, asymmetrical noise caused by asymmetry of an output of the limiter may be included in the recording signal. More specifically, when a slice level of the limiter, for limiting the amplitude of the recording signal to a constant level, is not correctly set, the amplitude of a frequency-modulated signal applied to the limiter is asymmetrically limited. As a result, a DC component is multiplexed on the output of the liminator.

FIG. 4 is a diagram showing a frequency spectrum for explaining the principle of generating such an asymmetrical noise, where the axis of the abscissa represents the frequency and the axis of the ordinate represents the signal level. If the DC component is multiplexed on the output of the limiter as described above, it is known that a signal component having a frequency of fm is produced on the low frequency band of the first signal. More specifically, as obvious from FIG. 4, the signal component having a frequency of fm becomes asymmetrical noise included in the frequency band B of the second signal, which deteriorates the SN ratio of the second signal in the recording signal.

When the recording signal is recorded on the rotary disc while including harmonic noise, linear distortion noise and asymmetrical noise as described above, the SN ratio of the second signal, in a signal reproduced from the rotary disc, is also deteriorated.

As described in the foregoing, in the conventional optical video disc recorder, even if a low-frequency component of the first signal is previously removed before frequency multiplexing, three kinds of noises are included in the recording signal, so that the SN ratio of the recording signal and the reproduced signal is deteriorated.

SUMMARY OF THE INVENTION

Therefore, a primary object of the present invention is to provide a frequency multiplexing circuit in an optical video disc recorder, which can cancel various noises produced when a recording signal, obtained by frequency-multiplexing a second signal comprising a sound signal on the low frequency band of a first signal comprising a frequency-modulated video signal, is limited through a limiter.

Briefly stated, the present invention is directed to a frequency multiplexing circuit in an optical video disc recorder for limiting a recording signal and optically recording the recording signal as a two-level signal on a rotary disc, which comprises a first signal source for supplying a first signal comprising a frequency-modulated video signal, a second signal source for supplying a second signal in a frequency band corresponding to the low frequency band of the first signal, an adder for adding the first signal and the second signal to frequency-multiplex the second signal on the low frequency band of the first signal thereby to generate a recording signal, a first limiter for symmetrically limiting the amplitude of the recording signal from the adder by a predetermined slice level, a first filter for separating a low-frequency component including a frequency band of the second signal from an output of the first limiter with a predetermined delay characteristic without changing a phase characteristic of the output of the first limiter, a second filter for delaying the second signal supplied from the second signal source with the same delay characteristic as that of the first filter without changing the phase characteristic, a first subtracter for subtracting an output of the second filter from an output of the first filter, a delay circuit for delaying the recording signal from the adder with the same delay characteristic as that of the first filter without changing the phase characteristic, a second subtracter for subtracting an output of the first subtracter from an output of the delay circuit, and a second limiter for symmetrically limiting the amplitude of an output of the second subtracter by a predetermined slice level.

In accordance with another aspect of the present invention, the frequency multiplexing circuit further comprises a first slice level adjusting circuit for setting a slice level of the first limiter and a second slice level adjusting circuit for setting a slice level of the second limiter.

Thus, a principal advantage of the present invention is that noise components comprising harmonic noise and linear distortion noise, of various noises produced in the band of the second signal, is previously subtracted from a recording signal generated by frequency multiplexing, so that the noises essentially produced in the recording signal by passing through the second limiter can be cancelled.

Another advantage of the present invention is that a slice level adjusting circuit of each limiter is provided, so that asymmetrical noise produced in the band of the second signal can be eliminated.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a frequency spectrum for explaining frequency multiplexing of a first signal and a second signal;

FIGS. 2(a)–2(d) are waveform diagrams for explaining the process of frequency-multiplexing the first signal and the second signal;

DESCRIPTION OF THE PREFERRED EMBODIMENT

Figure 5:
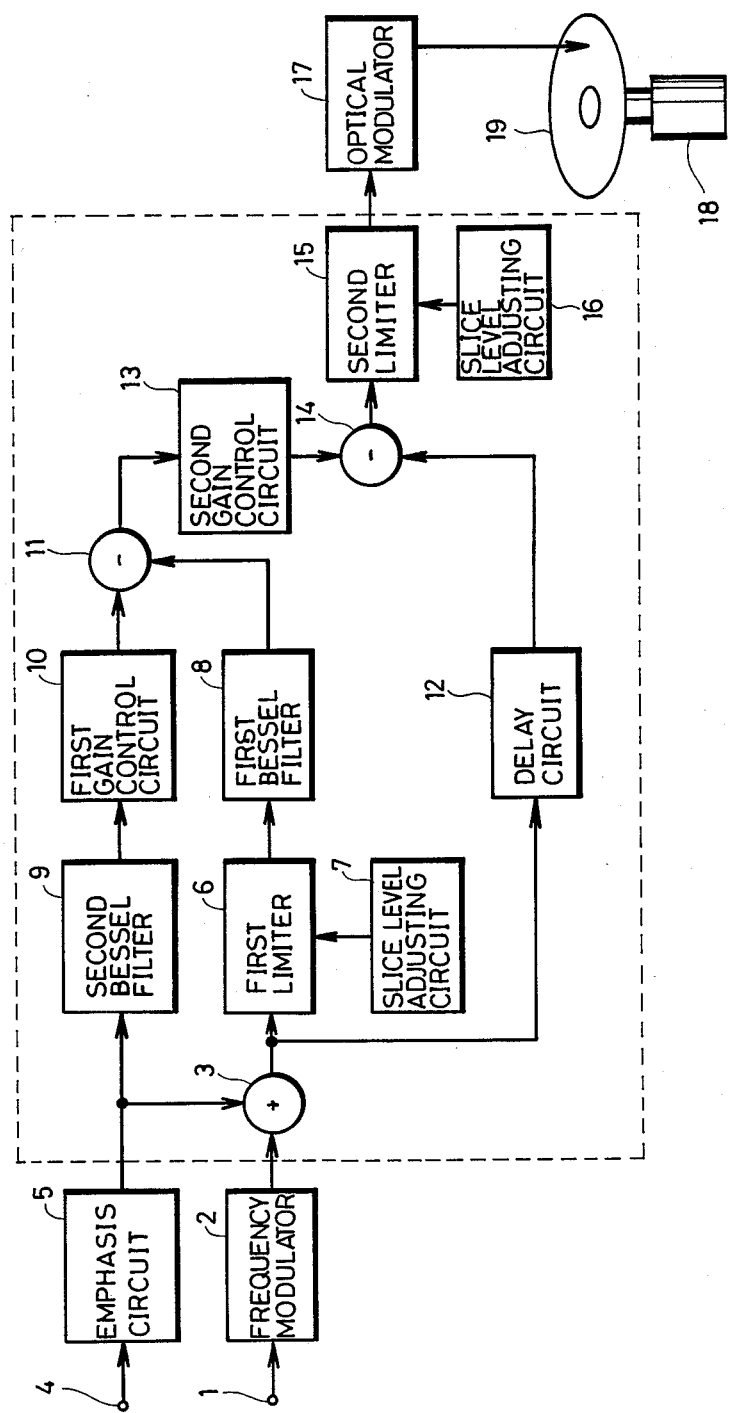
FIG. 5 is a schematic block diagram showing a frequency multiplexing circuit according to an embodiment of the present invention.
Figure 6:
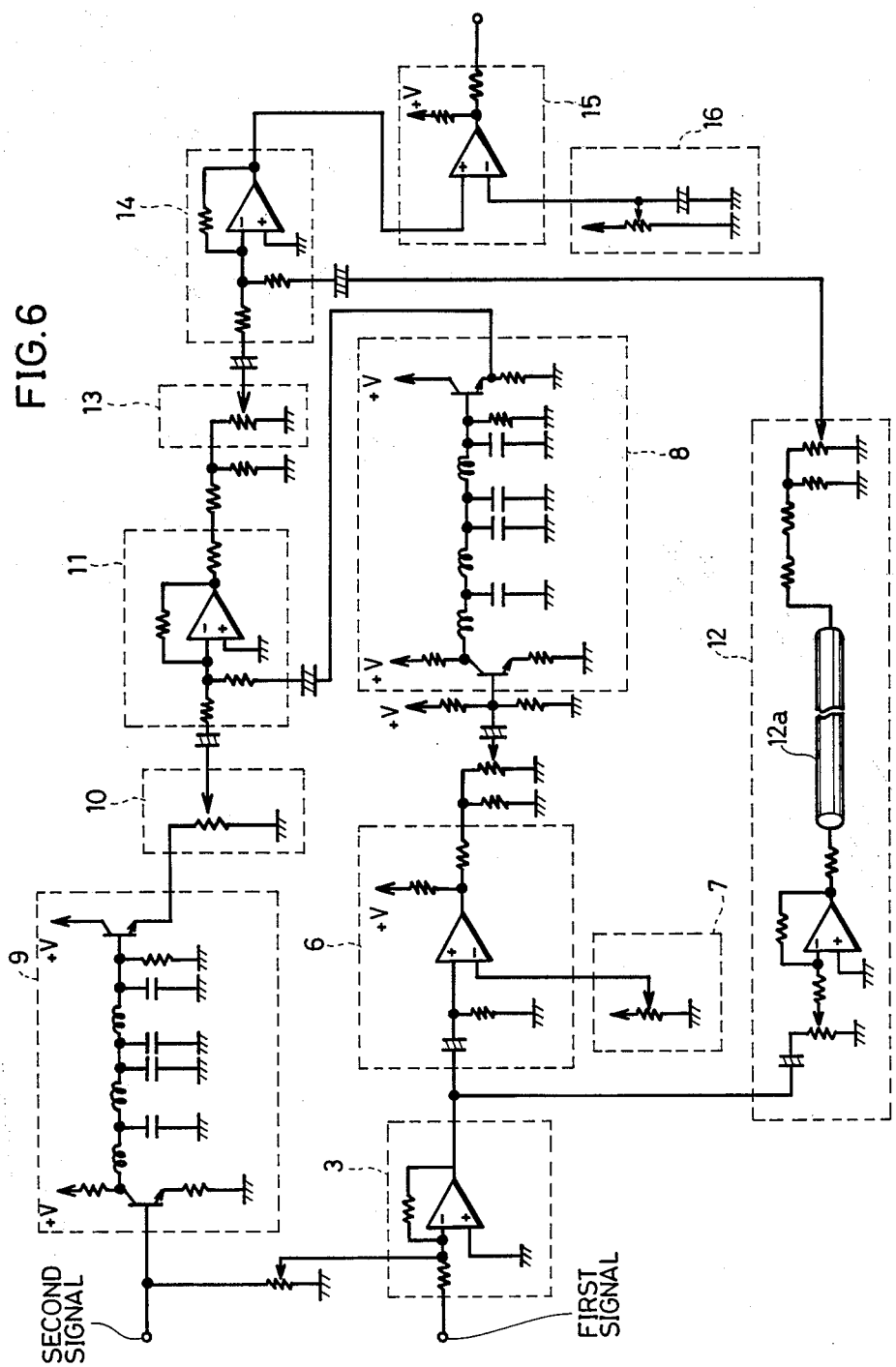
FIG. 6 is a circuit diagram showing an example of a circuit for implementing main portions of the frequency multiplexing circuit shown in FIG. 5.

FIG. 5 is a schematic block diagram showing a frequency multiplexing circuit in an optical video disc recorder according to an embodiment of the present invention. In addition, FIG. 6 is a circuit diagram showing an example of a circuit for implementing main portions (portions enclosed by a dotted line) of the frequency multiplexing circuit shown in FIG. 5. In FIG. 6, each block enclosed by a dotted line corresponds to each block having the same reference numeral in FIG. 5 and illustrates the content thereof in detail.

According to the present embodiment shown in FIGS. 5 and 6, a video signal comprises a compressed video signal, i.e., a so-called MUSE signal, obtained by compressing the band of a high definition video signal by using a Multiple Sub-Niquist Sampling Encoding system. On the other hand, a sound signal comprises a digital sound signal (1.8 MHz or less) of a type used in a compact disc (CD). A method for forming such a compressed video signal is a well-known technique which is explained in, or example, (1) "Nikkei Electronics", Japanese publication issued from Nikkei McGraw-Hill, Inc. on Mar. 12, 1984, pp. 112–116, (2) the collection of technical papers for anniversary meeting of NHK General Technical Institute and NHK Broadcasting Scientific Basic Institute "New Transmission System of High Quality Television", June 6, 1984 or (3) technical paper for Third International Colloquium on Advanced Television Systems; HDTV 1987, Ottawa, Canada, "BROADCASTING AND TRANSMISSION SYSTEM-MUSE-" by Y. Ninomiya et al., October 4-8, 1987. In addition, a method for forming a digital sound signal is a well-known technique which is explained in, for example, "ZUKAI COMPACT DISC TOKUHON" issued from Ohm, Tokyo, Japan on Nov. 25, 1982.

In FIG. 5, the above described MUSE signal is supplied, as a video signal from a video signal source (not shown) to an input terminal 1. The supplied MUSE signal is applied to a frequency modulator 2, to be subjected to frequency modulation to a deviation area of 13 to 16 MHz. An output of the frequency modulator 2 is applied, as a first signal, to one input of an adder 3. On the other hand, the above described digital sound signal is supplied, as a second signal, from a sound signal source (not shown) to an input terminal 4. The supplied second signal, the low frequency band of which is emphasized by an emphasis circuit 5, is applied to the other input of the adder 3. More specifically, the first signal and the second signal are frequency-multiplexed in the adder 3. An example of the adder 3 is shown in block 3 in FIG. 6.

Then, an output of the adder 3 is applied to a first limiter 6, the amplitude thereof being limited by a predetermined slice level. The first limiter 6 substantially comprises a comparator as shown in block 6 in FIG. 6. The above described slice level must be set such that the amplitude of a frequency-multiplexed signal input to the limiter is symmetrically limited. Therefore, there is provided a first slice level adjusting circuit 7 for adjusting a slice level of the first limiter 6. The first slice level adjusting circuit 7 substantially comprises a variable resistor connected to one input terminal of the comparator of the first limiter 6, as shown in blocks 6 and 7 in FIG. 6. Such a slice level adjusting circuit is provided to suitably adjust the slice level of the first limiter 6, so that the above described asymmetrical noise is not included in an output of the first limiter 6.

Then, the output of the first limiter 6 is applied to a first Bessel filter 8. The first Bessel filter 8 is a low-pass filter for separating a frequency band component of the second signal from the input signal and outputting the same without changing a phase characteristic of the input signal, which has a predetermined delay characteristic. Circuit structure of the Bessel filter 8 is shown in block 8 in FIG. 6. As such a low-pass filter, any filter can be used in which only a low-frequency component can be extracted without changing the phase characteristic of the passed band component. For example, the Bessel filter shown in FIG. 6 may be replaced with a transversal filter.

An output of the first Bessel filter 8 includes the above described harmonic noise and linear distortion noise (excluding the above described asymmetrical noise), in addition to the component of the second signal. Thus, the noise components must be separated for suppressing noise.

The second signal, the low frequency band of which is emphasized by the emphasis circuit 5, is applied to the input of the adder 3 as described above, as well as to second Bessel filter 9. The second Bessel filter 9 functions as a delay means having the same delay characteristic as that of the first Bessel filter 8. Thus, the delay time of an output of the second Bessel filter 9 coincides with that of the first Bessel filter 8.

The output of the second Bessel filter 9 is applied to a first gain control circuit 10, by which the level of the output of the second Bessel filter 9 coincides with the level of the component of the second signal in the out-out of the first Bessel filter 8. The first gain control circuit 10 substantially comprises a variable resistor as shown in block 10 in FIG. 6.

Then, both the output of the first Bessel filter 8 and an output of the first gain control circuit 10 are applied to a first subtracter 11, where the latter is subtracted from the former. More specifically, the second signal component output from the first gain control circuit 10 is subtracted from the second signal component, including a noise component, output from the first Bessel filter 8. As a result, only the noise component included in the band of the second signal is separated and output. An example of the first subtracter 11 is shown in block 11 in FIG. 6.

On the other hand, the frequency-multiplexed signal output from the adder 3 is applied to the first limiter 6, as well as to a delay circuit 12. The delay circuit 12 has the same delay characteristic as those of the above described Bessel filters 8 and 9. As a result, the delay time of the output of the adder 3 coincides with the delay time of the noise component output from the first subtracter 11. An example of the delay circuit is shown in block 12 in FIG. 6. In block 12, numeral 12a denotes a coaxial cable for delay.

On the other hand, the noise component output from the first subtracter 11 is applied to a second gain control circuit 13. The second gain control circuit 13 substantially comprises a variable resistor as shown in a block 13 in FIG. 6.

Then, both the output of the delay circuit 12 and an output of the second gain control circuit 13 are applied to a second subtracter 14, where the latter is subtracted from the former. More specifically, if the noise level is adjusted by the second gain control circuit 13, an output of the second subtracter 14 may include a negative noise component. An example of the second subtracter 14 is shown in block 14 in FIG. 6.

Furthermore, the output of the second subtracter 14 is applied to a second limiter 15, the amplitude thereof being limited by a predetermined slice level. The second limiter 15 substantially comprises a comparator as shown in block 15 in FIG. 6. A noise component essentially produced in an output of the second limiter 15 by passing through the limiter 15 is cancelled by the negative noise component previously included in an input to the second limiter 15 as described above. More specifically, the level of the noise component output from the subtracter 11 is adjusted by the second gain control circuit 13 such that noise is completely cancelled from the output of the second limiter 15. In addition, a slice level of the second limiter 15 must be set such that the amplitude of the input signal is symmetrically limited, as in the above described case of the first limiter 6. Therefore, there is provided a second slice level adjusting circuit 16 for adjusting the slice level of the second limiter 15. The second slice level adjusting circuit 16 substantially comprises a variable resistor connected to one input terminal of the comparator of the second limiter 15, as shown in blocks 15 and 16 in FIG. 6. Such a slice level adjusting circuit is provided suitably to adjust the slice level of the second limiter 15, so that the output of the second limiter 15 does not include the above described asymmetrical noise.

Thus, a recording signal, from which all noise components are removed, is output from the second limiter 15 and applied to an optical modulator 17. The optical modulator 17 irradiates a laser beam optically modulated in response to the applied recording signal onto the surface of a disc 19 rotated by a motor 18. As a result, a recording track is formed spirally on the surface of the disc. In addition, the recording track comprises a lot of recording pits indicating binary information.

Figure 3:
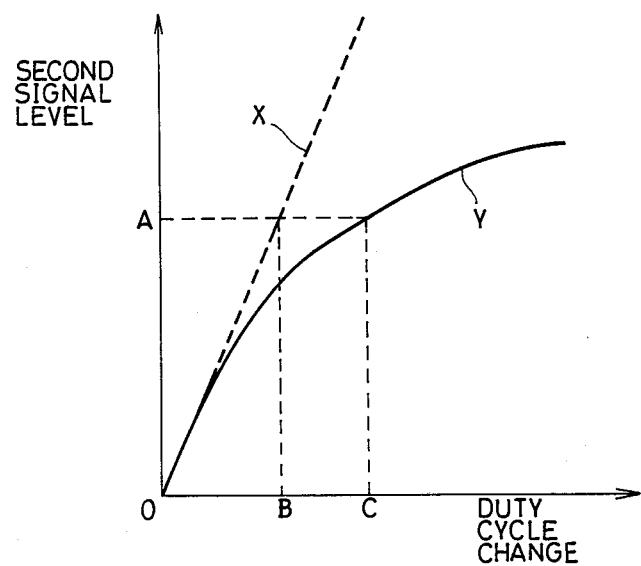
FIG. 3 is a graph for explaining the principle of generating linear distortion noise.

As described in the foregoing, according to the embodiment of the present invention, the noise component comprising the harmonic noise shown in FIG. 1 and the linear distortion noise shown in FIG. 3, of various noises produced in the band of the second signal, is previously subtracted form a recording signal generated by frequency multiplexing, so that the noise essentially produced in the recording signal by passing through the second limiter 15 can be cancelled.

Figure 4:
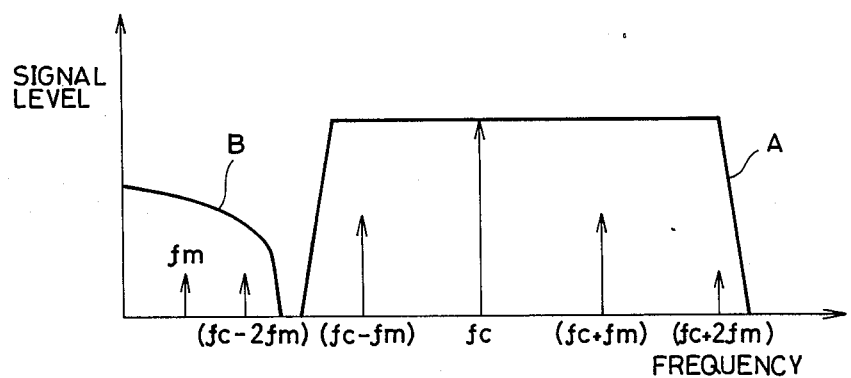
FIG. 4 is a diagram showing a frequency spectrum for explaining the principle of generating asymmetrical noise.

More specifically, the noise component is cancelled so that the harmonic noise (in the position of, for example, fc−2fm) produced in the band B of the second signal shown in FIG. 1 can be erased and the linear distortion noise caused by modulation distortion (C−B) from the ideal characteristic X of the amount of change in duty cycle in FIG. 3 can be also eliminated. In addition, the slice level adjusting means of each limiter is provided, so that the asymmetrical noise having a frequency of fm produced in the band B of the second signal as shown in FIG. 4 can be eliminated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A frequency multiplexing circuit in an optical video disc recorder for limiting a recording signal and optically recording the recording signal as a two-level signal on a rotary disc, comprising:
    a first signal source for supplying a first signal comprising a frequency-modulated video signal,
    a second signal source for supplying a second signal in a frequency band corresponding to a low frequency band of said first signal,
    adder means for adding said first signal and said second signal to frequency-multiplex said second signal on the low frequency band of said first signal thereby to generate a recording signal,
    first limiter means for symmetrically limiting an amplitude of the recording signal output from said adder means by a predetermined slice level,
    first filter means for separating a low-frequency component, including the frequency band of said second signal, from an output of said first limiter means with a predetermined delay characteristic without changing a phase characteristic of an output of said first limiter means,
    second filter means for delaying the second signal supplied from the second signal source with the same delay characteristic as that of said first filter means without changing a phase characteristic,
    first subtracter means for subtracting an output of said second filter means from an output of said first filter means,
    delay means for delaying the recording signal output from said adder means with the same delay characteristic as that of said first filter means without changing the phase characteristic,
    second subtracter means for subtracting an output of said first subtracter means from an output of said delay means, and
    second limiter means for symmetrically limiting an amplitude of an output of said second subtracter means by a predetermined slice level.

2. A frequency multiplexing circuit according to claim 1, which further comprises
    first slice level adjusting means for setting a slice level of said first limiter means, and
    second slice level adjusting means for setting a slice level of said second limiter means.

3. A frequency multiplexing circuit according to claim 1, which further comprises
    emphasis means for emphasizing a low-frequency component of said second signal supplied to said adder means and said second filter means.

4. A frequency multiplexing circuit according to claim 1, which further comprises
    first gain control means for establishing coincidence of a level of the output of the first filter means and a level of the output of the second filter means both supplied to said first subtracter means.

5. A frequency multiplexing circuit according to claim 1, which further comprises
    second gain control means for adjusting a level of an output of the first subtracter means supplied to said second subtracter means.

* * * * *